United States Patent
Ichikawa et al.

(10) Patent No.: US 11,489,973 B2
(45) Date of Patent: Nov. 1, 2022

(54) APPARATUS AND METHOD FOR PERFORMING SHEET DISCHARGE CONTROL OF A PRINTED MATERIAL BASED ON A DETERMINATION RESULT

(71) Applicant: CANON KABUSHIKI KAISHA, Tokyo (JP)

(72) Inventors: Masanori Ichikawa, Kanagawa (JP); Yosuke Obayashi, Chiba (JP); Minoru Kambegawa, Chiba (JP); Junichi Goda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/146,202

(22) Filed: Jan. 11, 2021

(65) Prior Publication Data

US 2021/0234969 A1    Jul. 29, 2021

(30) Foreign Application Priority Data

Jan. 24, 2020   (JP) .............................. JP2020-010113

(51) Int. Cl.
*H04N 1/00*   (2006.01)
*H04N 1/23*   (2006.01)

(52) U.S. Cl.
CPC ..... *H04N 1/00082* (2013.01); *H04N 1/00005* (2013.01); *H04N 1/00013* (2013.01); *H04N 1/00015* (2013.01); *H04N 1/00031* (2013.01); *H04N 1/00034* (2013.01); *H04N 1/00063* (2013.01); *H04N 1/00068* (2013.01); *H04N 1/00633* (2013.01); *H04N 1/2376* (2013.01)

(58) Field of Classification Search
None
See application file for complete search history.

(56) References Cited

U.S. PATENT DOCUMENTS

| | | | |
|---|---|---|---|
| 2010/0033743 A1* | 2/2010 | Hirai | H04N 1/00005 358/1.9 |
| 2013/0223866 A1* | 8/2013 | Kazama | G06F 3/1259 399/82 |
| 2020/0013158 A1* | 1/2020 | Asai | G06T 7/0002 |
| 2020/0097645 A1* | 3/2020 | Tokie | G06F 16/538 |
| 2020/0210115 A1* | 7/2020 | Igawa | G06F 3/1274 |
| 2020/0233618 A1* | 7/2020 | Ayukawa | G06F 3/1218 |
| 2020/0322492 A1* | 10/2020 | Kurohata | H04N 1/00477 |
| 2021/0127017 A1* | 4/2021 | Ichikawa | H04N 1/0009 |
| 2021/0127018 A1* | 4/2021 | Obayashi | H04N 1/0009 |

FOREIGN PATENT DOCUMENTS

| | | | |
|---|---|---|---|
| JP | 2015120264 A | * | 7/2015 |
| JP | 2016110294 A | | 6/2016 |

* cited by examiner

*Primary Examiner* — Scott A Rogers
(74) *Attorney, Agent, or Firm* — Canon U.S.A., Inc. IP Division

(57) ABSTRACT

An apparatus includes an output unit configured to output a printed material of a verification image in a case where a condition is satisfied, an obtainment unit configured to obtain a verification result based on a comparison between a read image of the printed material of the verification image and a correct answer image, and a control unit configured to control printing based on the verification result.

12 Claims, 9 Drawing Sheets

FIG.7

| No. | CONDITION | INSPECTION PRINTING IMAGE |
|---|---|---|
| 1 | FIRST SHEET OF PRINTING | INSPECTION IMAGE A |
| 2 | ARTICLE INSPECTION RESULT IS PASS FOR 100 SHEETS IN A ROW | INSPECTION IMAGE B |
| 3 | | |

FIG.9A

INSPECTION PROCESSING
IS NORMALLY OPERATING.
INSPECTION PRINTING SHEET IS
OUTPUT TO SHEET DISCHARGE TRAY.

[SETTING OF INSPECTION PRINTING] — 901

FIG.9B

ERROR IS DETECTED IN
INSPECTION PROCESSING.
PRINTING IS STOPPED.

[SETTING OF INSPECTION PRINTING]

FIG.9C

INSPECTION PRINTING

| SETTING | |
|---|---|
| ON/OFF OF INSPECTION PRINTING | ON — 902 |
| INSPECTION CONDITION 1 | ON — 903 |
| INSPECTION CONDITION 2 | ON — 904 |

[ADD INSPECTION CONDITION] — 905

FIG.9D

CONDITION SETTING

| INSPECTION CONDITION — 906 | | SETTING OF INSPECTION IMAGE — 907 | |
|---|---|---|---|
| NUMBER OF PRINT COPIES | | ☑ | POSITION |
| NUMBER OF CONSECUTIVE PASSES IN ARTICLE INSPECTION | | ☑ | COLOR TONE |
| NUMBER OF CONSECUTIVE FAILS IN ARTICLE INSPECTION | | ☑ | DENSITY |
| | | ☑ | STREAK |
| | | ☑ | BLANK AREA |

[OK] — 908

APPARATUS AND METHOD FOR PERFORMING SHEET DISCHARGE CONTROL OF A PRINTED MATERIAL BASED ON A DETERMINATION RESULT

BACKGROUND OF THE DISCLOSURE

Field of the Disclosure

The aspect of the embodiments relates to an image forming apparatus and an information processing method.

Description of the Related Art

Recently, a printing system has been known in which a verification apparatus can verify a sheet printed by a printing apparatus during conveyance of the sheet. In the verification of the printed sheet, the verification apparatus reads an image on the printed sheet being conveyed and determines whether the printed sheet is normal by performing image analysis on the read image. The verification apparatus can detect, for example, an incomplete bar code or ruled line, a missing image, a printing failure, a missing page, and a color shift. In a case where the printed sheet is determined as a defective sheet, the defective sheet is discharged to a sheet discharge destination different from a sheet discharge destination of a normal sheet. Accordingly, the defective sheet is prevented from being mixed into normal sheets, and an operator can discard the defective sheet.

According to a technique discussed in Japanese Patent Application Laid-Open No. 2016-110294, in a case where the printed sheet is determined as a defective sheet, a test pattern is printed to determine whether the test pattern is also defective. Accordingly, whether a printing system normally operates is checked.

SUMMARY OF THE DISCLOSURE

According to an aspect of the embodiments, an apparatus includes an output unit configured to output a printed material of a verification image in a case where a condition is satisfied, an obtainment unit configured to obtain a verification result based on a comparison between a read image of the printed material of the verification image and a correct answer image, and a control unit configured to control printing based on the verification result.

Further features of the present disclosure will become apparent from the following description of exemplary embodiments with reference to the attached drawings.

BRIEF DESCRIPTION OF THE DRAWINGS

FIG. 7 illustrates an example of predetermined conditions.

FIGS. 9A to 9D illustrate examples of display of verification printing results and setting screens of verification printing displayed on the display of the external controller.

DESCRIPTION OF THE EMBODIMENTS

According to a method discussed in Japanese Patent Application Laid-Open No. 2016-110294, an operation of a printing system is checked only in a case where a printed image is defective. Thus, if the printed image is not defective, it is not possible to check whether the printing system operates normally. For example, it is not possible to detect a case where an abnormality occurs to a verification apparatus and the verification apparatus cannot properly determine a defect in the printed image.

In addition, in a case where a defect cannot be identified in an image to be printed, it is not possible to check whether the printing system operates normally. Thus, the method discussed in Japanese Patent Application Laid-Open No. 2016-110294 has an issue that the method cannot guarantee that the printing system operates normally in every state of normal printing.

An exemplary embodiment of the disclosure will be described below with reference to the attached drawings.

In the descriptions below, an external controller is also referred to as an image processing controller, a digital front end (DFE), and a print server. An image forming apparatus is also referred to as a multifunction peripheral (MFP).

Figure 1:
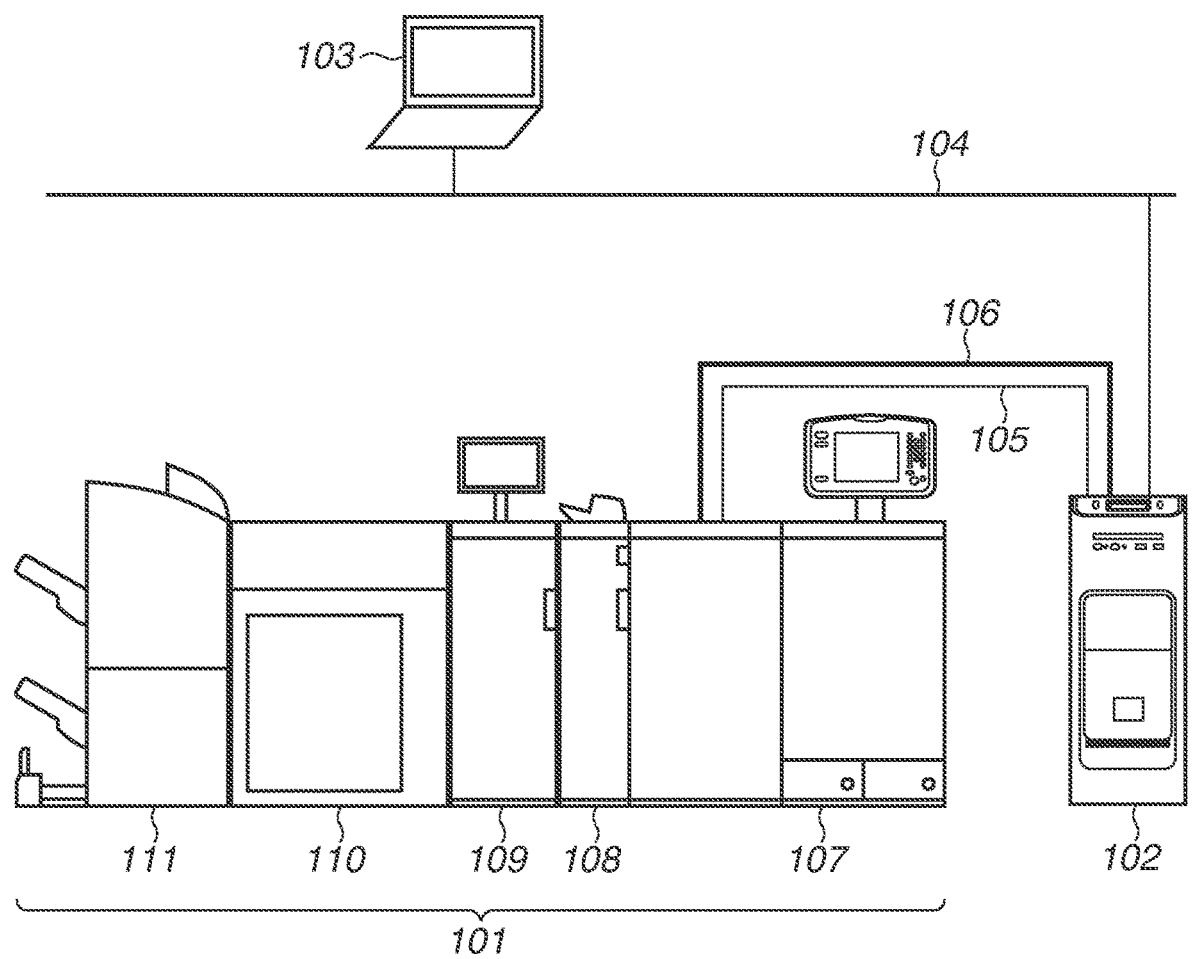
FIG. 1 illustrates an example of a system configuration of an image processing system.

FIG. 1 illustrates an example of a system configuration of an image processing system. The image processing system includes an image forming apparatus 101 and an external controller 102. The image forming apparatus 101 and the external controller 102 are connected with each other in a communicable manner via an internal local area network (LAN) 105 and a video cable 106. The external controller 102 is connected with a personal computer (PC) 103 in a communicable manner via an external LAN 104, and a print instruction is issued from the PC 103 to the external controller 102.

The PC 103 is installed with a printer driver that has a function of converting print data into data in a print description language that can be processed by the external controller 102. A user who intends to perform printing can issue a print instruction from each of various applications via the printer driver. The printer driver transmits print data to the external controller 102 based on the print instruction from the user. Upon receiving the print instruction from the PC 103, the external controller 102 performs data analysis and rasterization processing on the print data, inputs the print data into the image forming apparatus 101, and instructs the image forming apparatus 101 perform printing.

Next, the image forming apparatus 101 is described. The image forming apparatus 101 is connected with a plurality of apparatuses having different functions so that the image forming apparatus 101 can perform complicated print processing such as bookbinding.

A printing apparatus 107 forms an image with toner on a sheet conveyed from a sheet feeding unit located below the printing apparatus 107. A configuration and an operational principle of the printing apparatus 107 are as follows. A light beam such as a laser beam modulated based on image data is reflected by a rotary polygon mirror and applied on a photosensitive drum as scanning light. An electrostatic latent image formed on the photosensitive drum by the laser beam is developed with toner, and the toner image is transferred to a sheet adhered to a transfer drum. A series of image forming processes described above is sequentially executed using yellow (Y), magenta (M), cyan (C), and black (K) toners, and accordingly a full-color image is formed on the sheet. The sheet on which the full-color image has been formed on the transfer drum is conveyed to a fixing unit. The fixing unit includes a roller and a belt, and the roller includes a built-in heat source such as a halogen heater. The fixing unit fixes the toner of the toner image transferred on the sheet to the sheet by melting the toner with heat and pressure.

An inserter 108 performs insertion of an insertion sheet. The inserter 108 can insert a sheet at an arbitrary position into a sheet set that has been printed on the printing apparatus 107 and conveyed therefrom.

A verification apparatus 109 reads the image on the conveyed sheet and determines whether the printed image is normal by comparing the read image with a correct answer image registered in advance. The sheet is an example of a recording medium.

A large capacity stacker 110 can stack a large volume of sheets. A finisher 111 performs finishing processing on the conveyed sheet. The finisher 111 can perform finishing such as stapling, punching, and saddle stitch bookbinding and discharges the sheet to a sheet discharge tray.

The image processing system described in FIG. 1 has the configuration in which the image forming apparatus 101 is connected with the external controller 102. However, the configuration of the image processing system is not limited to the one in which the external controller 102 is connected with the image forming apparatus 101. More specifically, the image forming apparatus 101 may be connected to the external LAN 104, and print data that can be processed by the image forming apparatus 101 may be transmitted from the PC 103. In this case, the image forming apparatus 101 performs the data analysis and rasterization processing and executes print processing.

Figure 2:
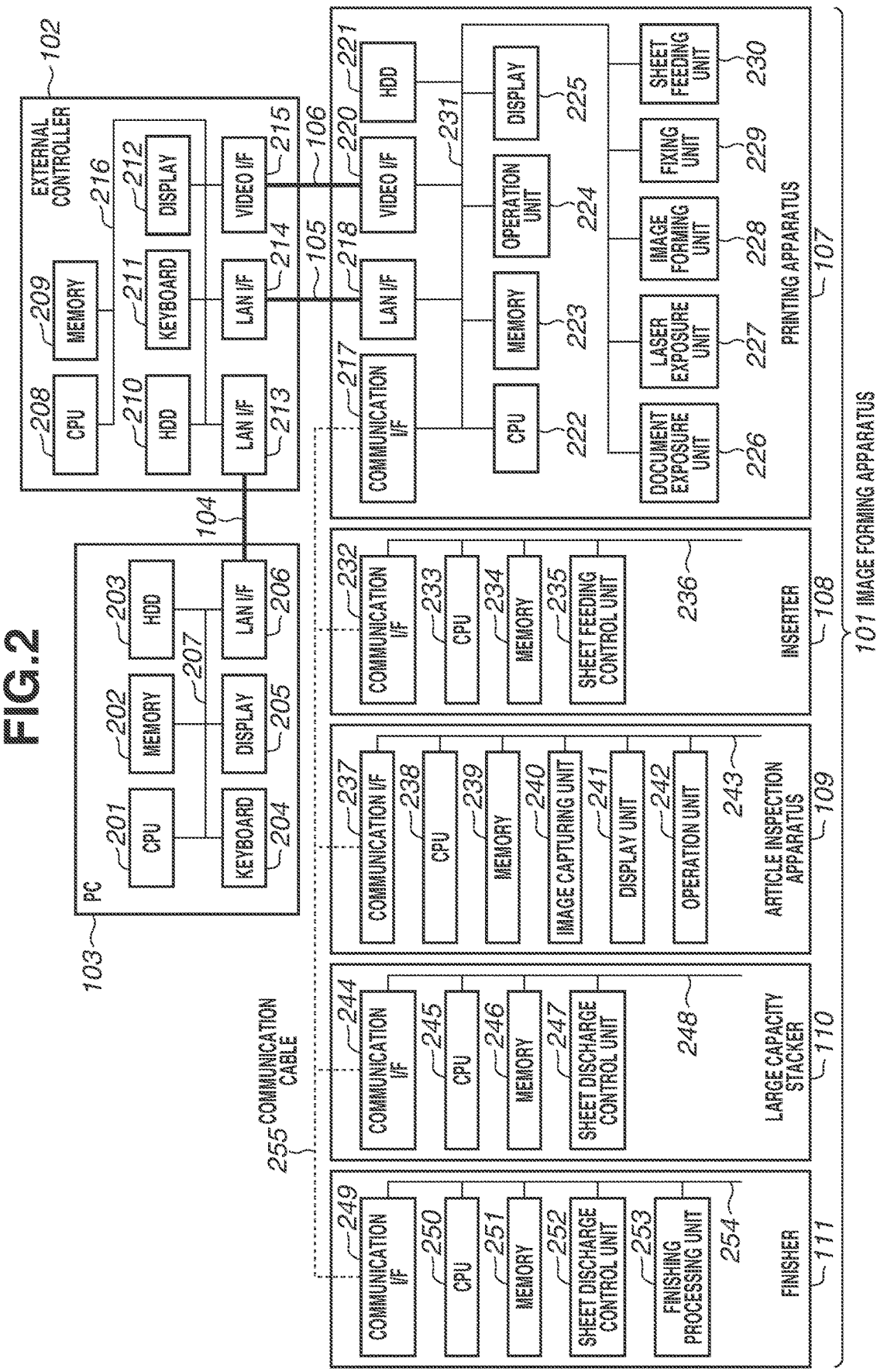
FIG. 2 illustrates an example of a hardware configuration of an image forming apparatus, an external controller, and a personal computer.

FIG. 2 illustrates an example of a hardware configuration of the image forming apparatus 101, the external controller 102, and the PC 103.

First, a configuration of the printing apparatus 107 of the image forming apparatus 101 is described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a sheet feeding unit 230. These components are connected with one another via a system bus 231.

The communication I/F 217 is connected with the inserter 108, the verification apparatus 109, the large capacity stacker 110, and the finisher 111 via a communication cable 255 and performs communication for controlling the apparatuses.

The LAN I/F 218 is connected with the external controller 102 via the internal LAN 105 and communicates print data therewith.

The video I/F 220 is connected with the external controller 102 via the video cable 106 and communicates image data therewith.

The HDD 221 is a storage device that stores a program and data. The CPU 222 comprehensively controls image processing and printing based on a program and the like stored in the HDD 221. The memory 223 stores a program for the CPU 222 to perform various types of processing and image data, and operates as a work area. The operation unit 224 receives an input of various settings and an operation instruction from a user. The display 225 displays setting information about the printing apparatus 107 and a processing status of a print job.

The document exposure unit 226 performs processing for reading a document in a case where a copy function or a scan function is used. The document exposure unit 226 captures an image with a complementary metal oxide semiconductor (CMOS) image sensor while irradiating a sheet set by a user with an exposure lamp and thus reads document data. The laser exposure unit 227 performs primary charging for irradiating the photosensitive drum with the laser beam and laser exposure to transfer a toner image. The laser exposure unit 227 first performs the primary charging for charging a surface of the photosensitive drum to a uniform negative potential. Next, the laser exposure unit 227 irradiates the photosensitive drum with the laser beam by a laser driver while controlling a reflection angle of the laser beam by a polygon mirror. Accordingly, a negative charge of an irradiated portion is neutralized, and an electrostatic latent image is formed.

The image forming unit 228 is a device for transferring toner to a sheet, and includes a developing unit, a transfer unit, and a toner replenishment unit. The image forming unit 228 transfers the toner on the photosensitive drum to a sheet. The developing unit attaches negatively charged toner from a developing cylinder to the electrostatic latent image on the surface of the photosensitive drum to visualize the image. The transfer unit performs primary transfer for transferring the toner on the surface of the photosensitive drum to a transfer belt by applying a positive potential to a primary transfer roller and secondary transfer for transferring the toner on the transfer belt to the sheet by applying the positive potential to an outer secondary transfer roller. The fixing unit 229 is a device for melting and fixing the toner on the sheet to the sheet with heat and pressure, and includes a heater, a fixing belt, and a pressure belt. The sheet feeding unit 230 is a device for feeding a sheet, and a sheet feed operation and a sheet conveyance operation are controlled with a roller and various sensors.

Next, the configuration of the inserter 108 of the image forming apparatus 101 is described. The inserter 108 of the image forming apparatus 101 includes a communication I/F 232, a CPU 233, a memory 234, and a sheet feeding control unit 235. These components are connected with one another via a system bus 236. The communication I/F 232 is connected with the printing apparatus 107 via the communication cable 255, and performs communication for control. The CPU 233 performs various types of control for feeding a sheet based on a control program stored in the memory 234. The memory 234 is a storage device that stores the control program. The sheet feeding control unit 235 controls feeding and conveyance of the sheet conveyed from a sheet feeding unit of the inserter 108 and the printing apparatus 107 while controlling a roller and a sensor based on an instruction from the CPU 233.

Next, the configuration of the verification apparatus 109 of the image forming apparatus 101 is described. The verification apparatus 109 of the image forming apparatus 101 includes a communication I/F 237, a CPU 238, a memory 239, an image capturing unit 240, a display unit 241, and an operation unit 242. These components are connected with one another via a system bus 243. The communication I/F 237 is connected with the printing apparatus 107 via the communication cable 255 and performs communication for control. The CPU 238 performs various types of control for verification based on a control program stored in the memory 239. The memory 239 is a storage device that stores the control program. The image capturing unit 240 captures an image of the conveyed sheet based on an instruction from the CPU 238. The image capturing unit 240 reads not only a printed material as a verification target but also a printed material to be a correct answer image candidate in registering a correct answer image. As the printed material to be the correct answer image candidate, an image obtained by superimposing and averaging a plurality of images obtained per page of the printed material is used. Accordingly, a minute fluctuation component included in the printed material that falls below verification accuracy can be eliminated as much as possible.

The CPU 238 compares an image captured by the image capturing unit 240 with the correct answer image stored in the memory 239 to determine whether the printed image is normal. The display unit 241 displays a verification result and a setting screen. The operation unit 242 is operated by a user and receives an instruction such as a setting change of the verification apparatus 109 and registration of the correct answer image.

Next, the configuration of the large capacity stacker 110 of the image forming apparatus 101 is described. The large capacity stacker 110 of the image forming apparatus 101 includes a communication I/F 244, a CPU 245, a memory 246, and a sheet discharge control unit 247. These components are connected with one another via a system bus 248. The communication I/F 244 is connected with the printing apparatus 107 via the communication cable 255 and performs communication for control. The CPU 245 performs various types of control for discharging a sheet based on a control program stored in the memory 246. The memory 246 is a storage device that stores the control program. The sheet discharge control unit 247 performs control to convey the conveyed sheet to a stack tray, an escape tray, or the subsequent finisher 111 based on an instruction from the CPU 245.

Next, the configuration of the finisher 111 of the image forming apparatus 101 is described. The finisher 111 of the image forming apparatus 101 includes a communication I/F 249, a CPU 250, a memory 251, a sheet discharge control unit 252, and a finishing processing unit 253. These components are connected with one another via a system bus 254. The communication I/F 249 is connected with the printing apparatus 107 via the communication cable 255 and performs communication for control. The CPU 250 performs various types of control for finishing and discharging a sheet based on a control program stored in the memory 251. The memory 251 is a storage device that stores the control program. The sheet discharge control unit 252 controls conveyance and discharge of a sheet based on an instruction from the CPU 250. The finishing processing unit 253 controls finishing processing such as stapling, punching, and saddle stitch bookbinding based on an instruction from the CPU 250.

Next, the configuration of the external controller 102 is described. The external controller 102 includes a CPU 208, a memory 209, a HDD 210, a keyboard 211, a display 212, a LAN I/F 213, a LAN I/F 214, and a video I/F 215 that are connected with one another via a system bus 216. The CPU 208 comprehensively executes processing such as reception of print data from the PC 103, raster image processor (RIP) processing, and transmission of the print data to the image forming apparatus 101 based on a program and data stored in the HDD 210. The memory 209 stores a program and data for the CPU 208 to perform various types of processing, and operates as a work area. The HDD 210 stores the program and data for an operation such as print processing. The keyboard 211 is used to input an operation instruction to the external controller 102. The display 212 displays information about an execution application of the external controller 102 using image signals of a still image and a moving image. The LAN I/F 213 is connected with the PC 103 via the external LAN 104, and communication of a print instruction and the like is performed therethrough. The LAN I/F 214 is connected with the image forming apparatus 101 via the internal LAN 105, and communication of a print instruction and the like is performed therethrough. The video I/F 215 is connected with the image forming apparatus 101 via the video cable 106, and communication of print data and the like is performed therethrough.

Next, the configuration of the PC 103 is described. The PC 103 includes a CPU 201, a memory 202, a HDD 203, a keyboard 204, a display 205, and a LAN I/F 206 that are connected with one another via a system bus 207. The CPU 201 generates print data and executes a print instruction based on a document processing program stored in the HDD 203. Further, the CPU 201 comprehensively controls each device connected to the system bus 207. The memory 202 stores a program and data for the CPU 201 to perform various types of processing, and operates as a work area. The HDD 203 stores a program and data for an operation such as print processing. The keyboard 204 is used to input an operation instruction to the PC 103. The display 205 displays information about an execution application of the PC 103 using image signals of a still image and a moving image. The LAN I/F 206 is connected to the external LAN 104, and communication of a print instruction and the like is performed therethrough.

In the above descriptions, the external controller 102 and the image forming apparatus 101 are connected to the internal LAN 105 and the video cable 106. However, any configuration may be used as long as data for printing can be transmitted and received. For example, connection may be made using only a video cable. Each of the memories 202, 209, 223, 234, 239, 246, and 251 may be a storage device for storing data and a program. For example, the memories may be replaced with a volatile random access memory (RAM), a nonvolatile read-only memory (ROM), a built-in HDD, an external HDD, and a Universal Serial Bus (USB) memory.

Figure 3:
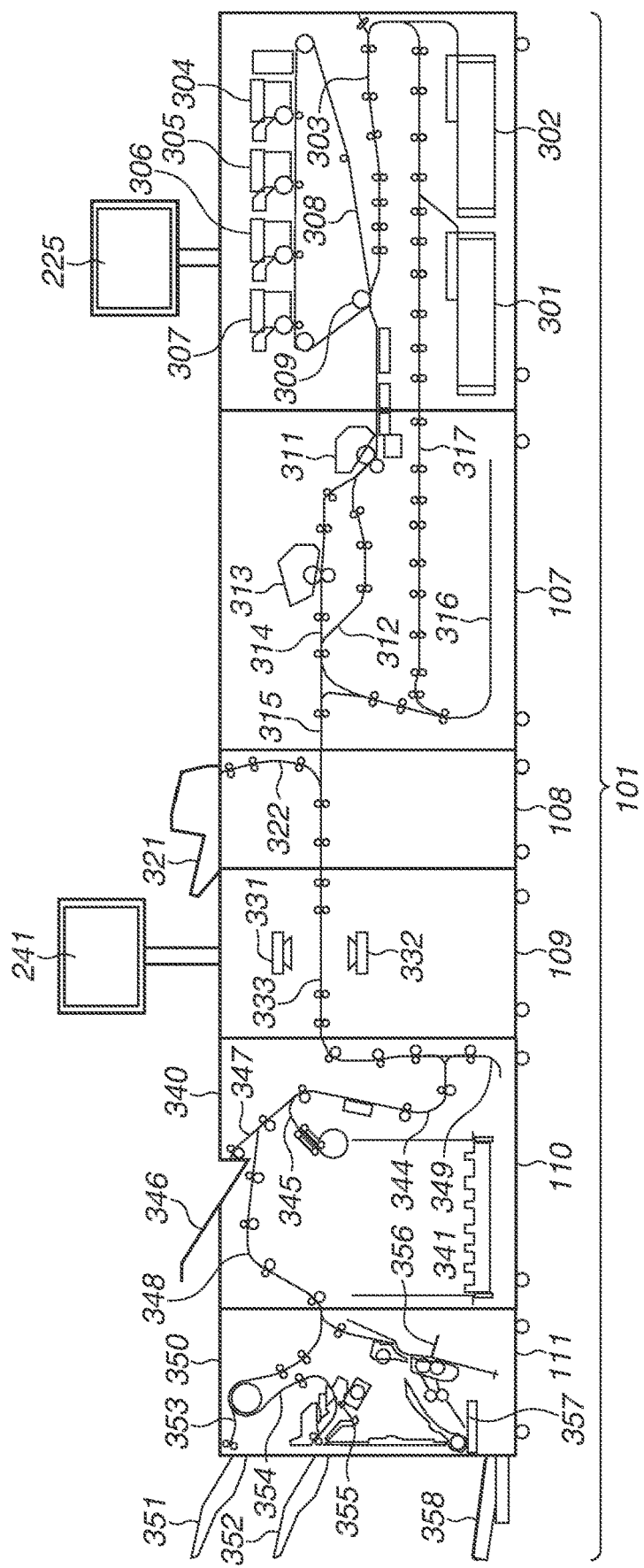
FIG. 3 illustrates an example of a mechanical cross section of the image forming apparatus.

FIG. 3 illustrates an example of a mechanical cross section of the image forming apparatus 101. The printing apparatus 107 forms an image to be printed on a sheet. Each of sheet feeding decks 301 and 302 can store various types of sheets. In each of the sheet feeding decks, it is possible to separate only one sheet on the top of the stored sheets and convey the sheet to a sheet conveyance path 303. Developing stations 304 to 307 respectively form toner images using colored toners of Y, M, C, and K to form a color image. The toner images formed in the developing stations are primarily transferred to an intermediate transfer belt 308. The intermediate transfer belt 308 rotates clockwise in FIG. 3 and transfers the toner image to the sheet transferred from the sheet conveyance path 303 at a secondary transfer position 309.

The display 225 displays a printing status of the image forming apparatus 101 and information for a setting. A fixing unit 311 fixes the toner image to the sheet. The fixing unit 311 includes a pressure roller and a heating roller, and fixes the toner image to the sheet by melting and pressing the toner on the sheet passing between the respective rollers. The sheet that has passed through the fixing unit 311 is conveyed through a sheet conveyance path 312 to a path 315. In a case where further melting and pressing is required for fixing depending on a type of the sheet, the sheet that has passed through the fixing unit 311 is conveyed to a second fixing unit 313 using an upper sheet conveyance path. After additional melting and pressing is performed, the sheet is conveyed through a sheet conveyance path 314 to the path 315. In a case where an image forming mode is two-sided printing, the sheet is conveyed to and reversed in a sheet reversing path 316 and conveyed to a two-sided conveyance path 317. Then, an image is transferred to a second surface of the sheet at the secondary transfer position 309.

The inserter 108 performs insertion of an insertion sheet. The inserter 108 includes an inserter tray 321 and merges a sheet fed through a sheet conveyance path 322 into the conveyance path. Accordingly, a sheet can be inserted into a series of sheet sets conveyed from the printing apparatus 107 at an arbitrary position and conveyed to a subsequent apparatus.

The sheet that has passed through the inserter 108 is conveyed to the verification apparatus 109. Contact image sensors (CISs) 331 and 332 are arranged in the verification apparatus 109 so as to face each other. The CISs 331 and 332 respectively read an upper surface and a lower surface of the sheet. An image sensor for reading may be a line scan camera instead of the CIS. The verification apparatus 109 can read an image on the sheet using the CISs 331 and 332 at a timing when the sheet conveyed to a sheet conveyance path 333 reaches a predetermined position and determine whether the read image on the sheet is normal. The display unit 241 displays a verification result performed by the verification apparatus 109.

The large capacity stacker 110 can stack a large volume of sheets. The large capacity stacker 110 includes a stack tray 341 on which sheets are stacked. The sheet that has passed through the verification apparatus 109 is input to the large capacity stacker 110 via a sheet conveyance path 344. The sheet is stacked on the stack tray 341 via the sheet conveyance path 344 and a sheet conveyance path 345. Further, a stacker 340 includes an escape tray 346 as a sheet discharge tray. The escape tray 346 is a sheet discharge tray used for discharging a sheet determined as a defective sheet by the verification apparatus 109. In a case where a sheet is output to the escape tray 346, the sheet is conveyed from the sheet conveyance path 344 via a sheet conveyance path 347 to the escape tray 346. In a case where a sheet is conveyed to a post-processing apparatus in a subsequent stage of the large capacity stacker 110, the sheet is conveyed via a sheet conveyance path 348. A reversing unit 349 reverses a sheet. The reversing unit 349 is used in a case where the sheet is stacked on the stack tray 341. In the case where the sheet is stacked on the stack tray 341, the sheet is reversed once in the reversing unit 349 so that an orientation of the input sheet is the same as an orientation of the sheet at a time of output. In a case where the sheet is conveyed to the escape tray 346 or to the post-processing apparatus in the subsequent stage, the sheet is discharged as it is without being flipped at the time of stacking, so that a reversing operation in the reversing unit 349 is not performed.

The finisher 111 applies finishing processing to the conveyed sheet depending on a function specified by a user. Specifically, the finisher 111 has finishing functions such as stapling (at one position or two positions), punching (two holes or three holes), and saddle stitch bookbinding. The finisher 111 includes two sheet discharge trays, namely sheet discharge trays 351 and 352. The finisher 111 outputs a sheet via a sheet conveyance path 353 to the sheet discharge tray 351. However, the finishing processing such as stapling cannot be performed in the sheet conveyance path 353. In a case where the finishing processing such as stapling is to be performed, the sheet is conveyed via a sheet conveyance path 354 to a processing unit 355 where the finishing function specified by a user is performed thereon and is output to the sheet discharge tray 352.

The sheet discharge trays 351 and 352 can be individually elevated and lowered. The sheet discharge tray 351 can be lowered so that the sheet subjected to the finishing processing in the processing unit 355 can be stacked thereon. In a case where the saddle stitch bookbinding is specified, a saddle stitching unit 356 performs staple processing on a center of the sheet, folds the sheet in half, and outputs the sheet via a sheet conveyance path 357 to a saddle stitch bookbinding tray 358. The saddle stitch bookbinding tray 358 has a belt conveyer configuration, and a bundle of saddle stitch bookbinding stacked on the saddle stitch bookbinding tray 358 is conveyed to a left side of the FIG. 3.

The verification apparatus 109 verifies an image on the conveyed sheet based on a verification item set in advance. The image on the conveyed sheet is verified by being compared with the correct answer image set in advance. An image comparison method includes a method for comparing pixel values for each pixel position, a method for comparing a position of an object by edge detection, and a method for extracting character data by optical character recognition (OCR). The verification item includes a shift in a print position, a color tone of an image, density of an image, a streak, thin printing, and a blank area.

Figure 5:
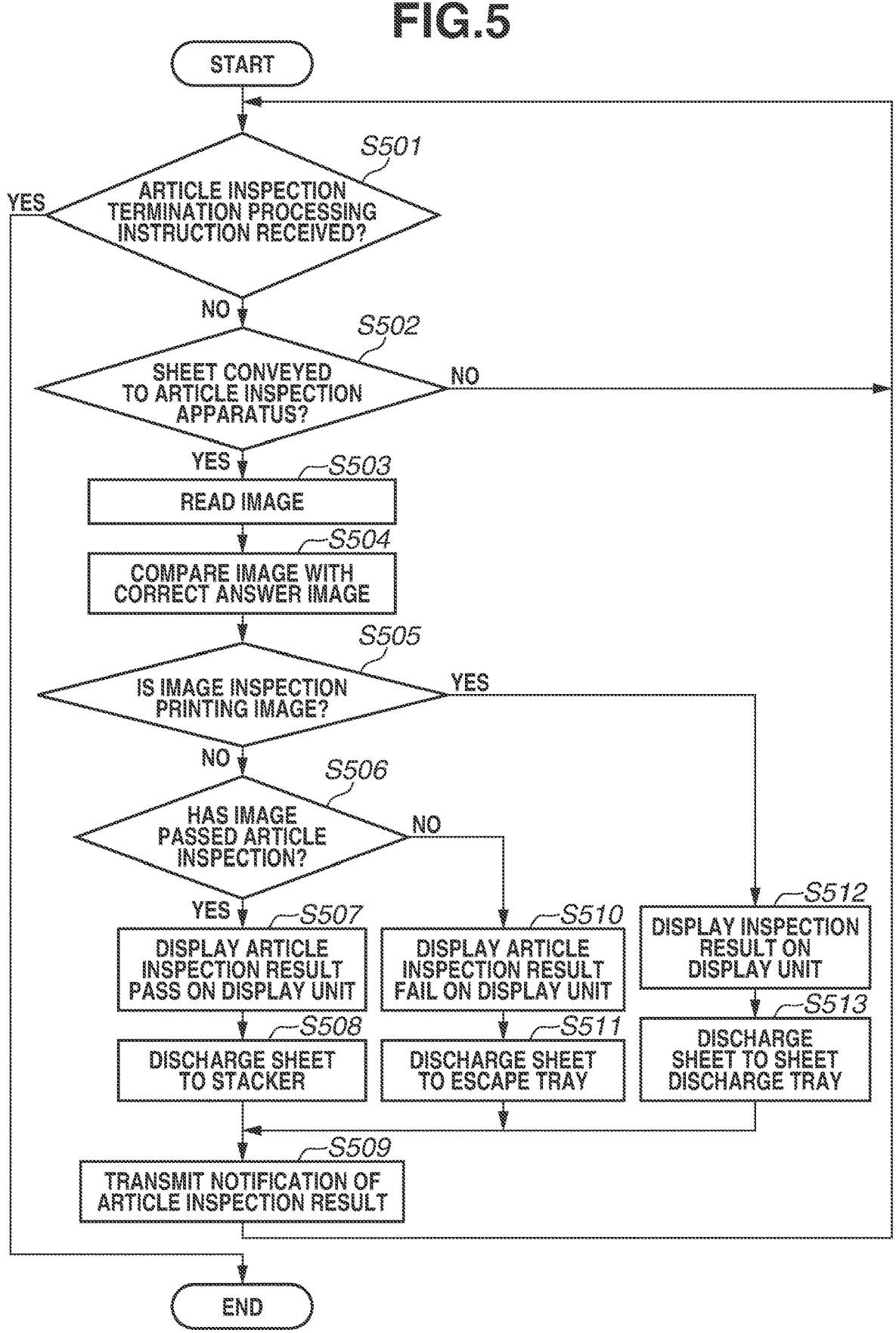
FIG. 5 is a flowchart illustrating a flow of verification processing in a verification apparatus.
Figure 6:
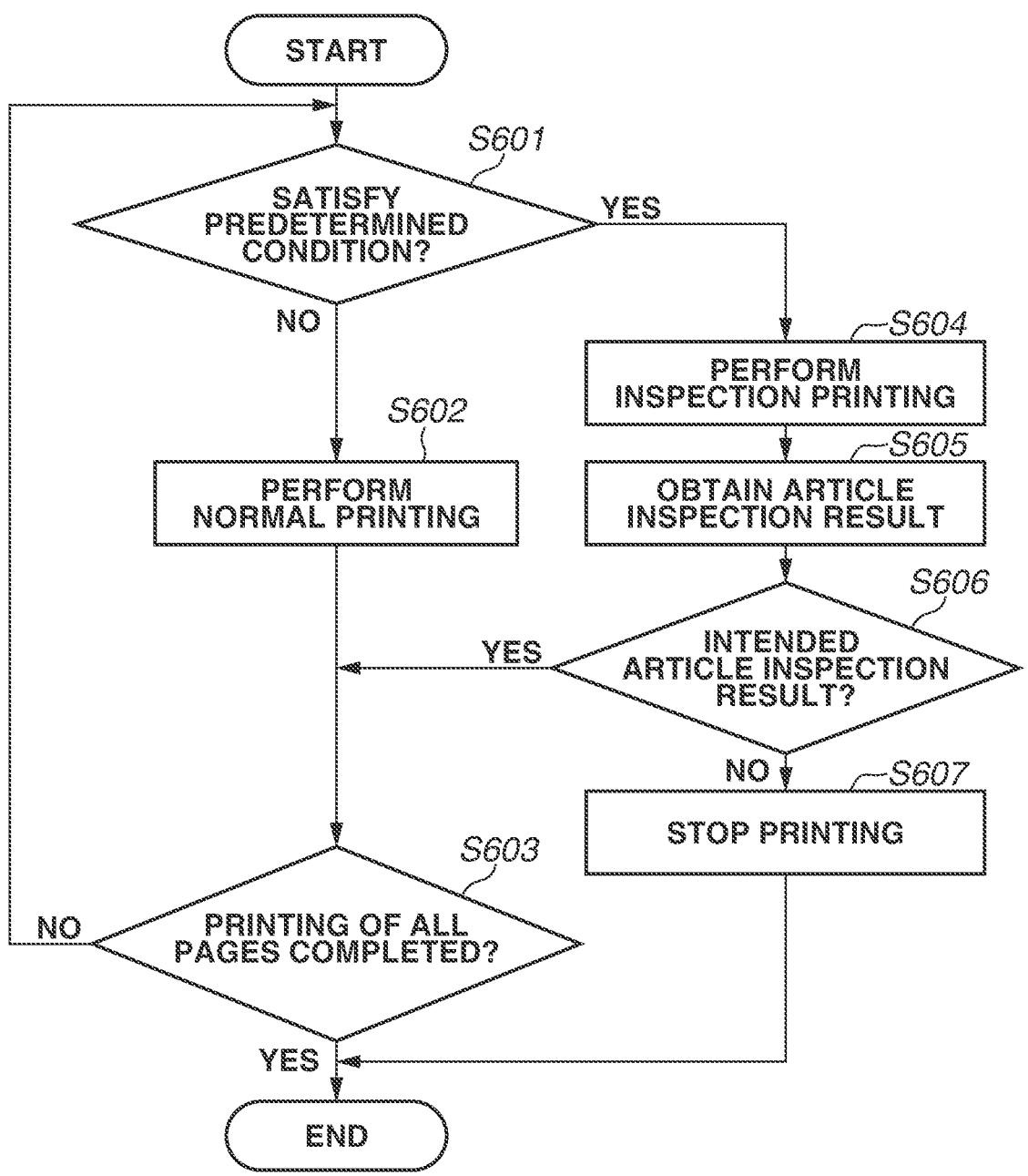
FIG. 6 is a flowchart illustrating a flow of verification processing in a printing apparatus.

Flows of registration processing of the correct answer image and image verification processing are described below with reference to FIGS. 4 to 6. The processing in FIGS. 4 to 6 is an example of information processing.

Figure 4:
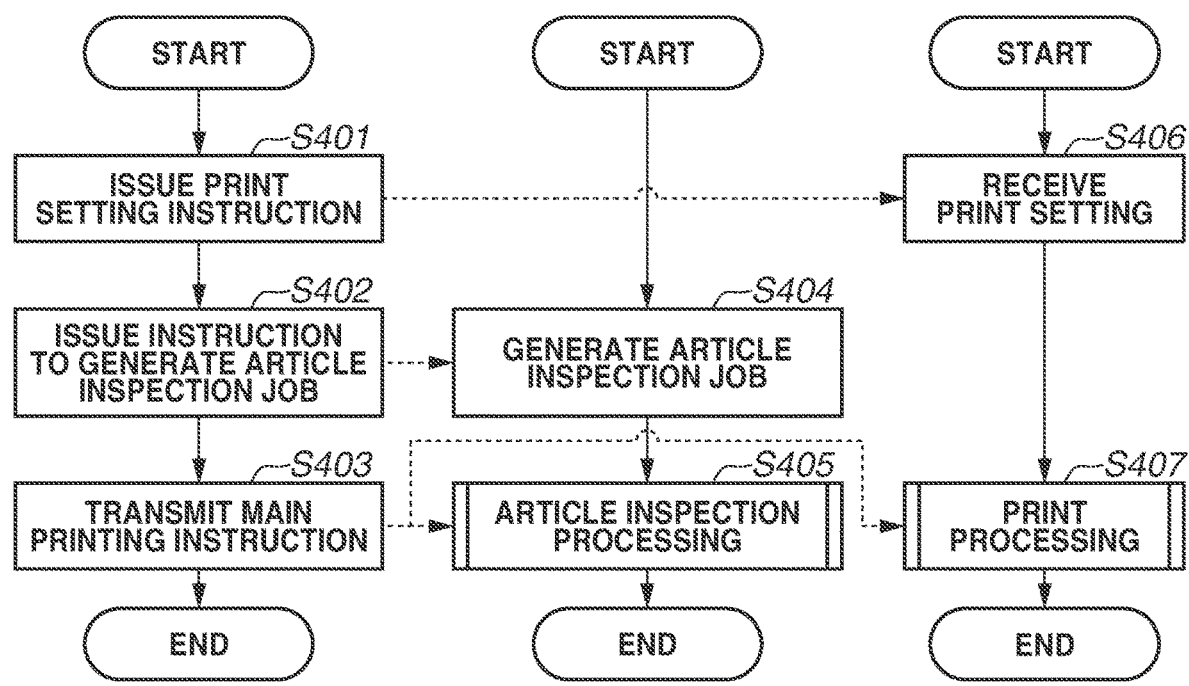
FIG. 4 is a flowchart illustrating a flow of entire processing.

FIG. 4 is a flowchart illustrating a flow of entire processing in the external controller 102, the verification apparatus 109, and the printing apparatus 107. The processing in steps S401 to S403 is performed in the external controller 102, the processing in steps S404 and S405 is performed in the verification apparatus 109, and the processing in steps S406 and S407 is performed in the printing apparatus 107.

In step S401, the CPU 208 receives an instruction to make a print setting from a user. The print setting includes information about a sheet feeding source and a sheet discharge destination in addition to image data to be printed on the printing apparatus 107. The printing apparatus 107 controls the inserter 108, the verification apparatus 109, the large capacity stacker 110, and the finisher 111 via the communication cable 255 based on a content of the print setting received from the external controller 102.

In step S402, the CPU 208 issues an instruction to the verification apparatus 109 to generate a verification job performed in the verification apparatus 109 based on the content of the print setting. In a case where the instruction to generate the verification job is issued, the CPU 208 transmits information about the number of sheets per copy, a surface to be verified, and the correct answer image generated in advance to the verification apparatus 109.

In step S403, the CPU 208 transmits a main printing instruction indicating a start of printing to the verification apparatus 109 and the printing apparatus 107.

In step S404, the CPU 238 generates the verification job based on the information transmitted in step S402.

In step S405, the CPU 238 performs verification processing based on the verification job using the main printing instruction transmitted in step S403 as a trigger. The verification processing is described below with reference to FIG. 5.

In step S406, the CPU 222 waits to receive the print instruction from the external controller 102. In a case where the print instruction from the external controller 102 is received in step S406, the CPU 222 advances the processing to step S407. In step S407, the printing apparatus 107 performs printing based on the content of the print setting received from the external controller 102.

In step S407, the CPU 222 performs print processing based on the content of the print setting using the main printing instruction transmitted in step S403 as the trigger. The print processing is described below with reference to FIG. 6.

FIG. 5 is a flowchart illustrating a flow of the verification processing in the verification apparatus 109.

In step S501, the CPU 238 determines whether an instruction for verification termination processing is received based on presence or absence a notification indicating that the print processing by the CPU 222 is completed. In a case where the instruction for the verification termination processing is received (YES in step S501), the CPU 238 ends the processing in the flow in FIG. 5. In a case where the instruction for the verification termination processing is not received (NO in step S501), the CPU 238 advances the processing to step S502.

In step S502, the CPU 238 waits for a sheet to be conveyed to the verification apparatus 109. In a case where the sheet is conveyed in step S502 (YES in step S502), the CPU 238 advances the processing to step S503.

In step S503, the CPU 238 reads an image on the sheet with the image capturing unit 240 and stores the read image in the memory 239 of the verification apparatus 109. Various types of image processing may be performed on the read image before the read image is stored in the memory 239.

In step S504, the CPU 238 compares the image read in step S503 with the correct answer image. The processing in step S504 is an example of processing for detecting a defect in a printed material by comparing the image read from the printed material with the correct answer image.

An item to be compared in step S504 is based on a verification level and a verification type that are set in advance. The correct answer image is registered in advance.

In step S505, the CPU 238 determines whether the image read in step S503 is a verification printing image. Verification printing in the printing apparatus 107, described below, is executed at a predetermined timing during normal printing. In a case where the verification printing is executed, the printing apparatus 107 notifies the verification apparatus 109 of the execution. Based on presence or absence of the notification, the CPU 238 can determines whether the image is the verification printing image. In a case where the image is determined as the verification printing image (YES in step S505), the CPU 238 advances the processing to step S512. In a case where the image is not determined as the verification printing image (NO in step S505), the CPU 238 advances the processing to step S506.

In step S506, the CPU 238 determines whether the read image is a normal image or a defective image based on a result of comparison with the correct answer image in step S504. In a case where the image is determined as the normal image, i.e., determined as having passed the verification (YES in step S506), the CPU 238 advances the processing to step S507. In a case where the image is determined as the defective image (NO in step S506), the CPU 238 advances the processing to step S510.

In step S507, the CPU 238 displays that a verification result is a pass on the display unit 241 of the verification apparatus 109.

In step S508, the CPU 238 instructs the printing apparatus 107 to discharge the printed sheet to the stack tray 341 of the large capacity stacker 110. The sheet discharge destination to be used here is based on the sheet discharge destination set in advance. The printing apparatus 107 instructs the large capacity stacker 110 to discharge the printed sheet to the stack tray 341 based on the instruction from the verification apparatus 109.

In step S509, the CPU 238 notifies the printing apparatus 107 of the verification result. A content to be notified includes whether it is the verification printing or normal printing and whether the verification result is a pass or fail. Alternatively, the content to be notified may be only whether the verification result is a pass or fail. The CPU 238 may transmit the notification to the external controller 102.

In step S510, the CPU 238 displays that the verification result is a fail on the display unit 241 of the verification apparatus 109.

In step S511, the CPU 238 instructs the printing apparatus 107 to discharge the printed sheet to the escape tray 346 of the large capacity stacker 110. The sheet discharge destination to be used here is based on the sheet discharge destination set in advance. The printing apparatus 107 instructs the large capacity stacker 110 to discharge the printed sheet to the escape tray 346 based on the instruction from the verification apparatus 109.

In step S512, the CPU 238 displays that the corresponding printing is the verification printing on the display unit 241 of the verification apparatus 109. At the same time, the CPU 238 also displays a verification result. Basically, because an image of which a verification result is to be a fail is printed as a verification image, if the verification result is determined as the fail, the CPU 238 displays that the printing apparatus 107 is normally operating as a verification result. If the verification result is determined as a pass, the CPU 238 displays that there is a possibility that the verification apparatus 109 has an abnormality as the verification result. The verification image is an image with a defect. FIGS. 9A and 9B illustrate examples of display screens. FIG. 9A is a display example in a case where the verification result is the fail (verification result is normal). FIG. 9B is a display example in a case where the verification result is the pass (verification result is abnormal).

In step S513, the CPU 238 instructs the printing apparatus 107 to discharge the printed sheet to the sheet discharge tray 351 of the finisher 111. The sheet discharge destination to be used here is based on the sheet discharge destination set in advance. The printing apparatus 107 instructs the large capacity stacker 110 and the finisher 111 to discharge the printed sheet to the sheet discharge tray 351 based on the instruction from the verification apparatus 109.

FIG. 6 is a flowchart illustrating a flow of the verification processing in the printing apparatus 107.

In step S601, the CPU 222 determines whether a print timing satisfies a predetermined condition. A timing for performing the verification printing is determined here. As the predetermined condition, a condition based on a printing operation and a state of the verification result can be set. The predetermined condition includes, for example, a number of the sheet that is subjected to the printing operation, and the verification result has been a pass for a predetermined number of sheets. In FIG. 7, "a first sheet of printing" and "the verification result is a pass for 100 sheets in a row" are described as the conditions. The condition "the verification result is a pass for 100 sheets in a row" is an example of a condition that a number of defects detected in the printed material is less than a predetermined number. The present setting is to be set by a user in advance, and an example of a setting screen of the verification printing is described below with reference to FIG. 9C. The condition may be based on a state of a sensor (not illustrated) of a temperature of the printing apparatus 107 and the verification apparatus 109. Whether the conditions indicated in FIG. 7 are satisfied is determined in order from the top of a table, but the order is not limited thereto. In step S601, in a case where it is determined that the print timing does not satisfy the predetermined condition (NO in step S601), the CPU 222 advances the processing to step S602. In a case where it is determined that the print timing satisfies the predetermined condition (YES in step S601), the CPU 222 advances the processing to step S604.

In step S602, the CPU 222 performs a normal printing operation. The normal printing operation refers to printing an originally intended image.

In step S603, the CPU 222 determines whether the printing operation is completed on all pages. In a case where it is determined that the printing operation is completed on all pages (YES in step S603), the CPU 222 ends the processing in the flow in FIG. 6. In a case where it is determined that the printing operation is not yet completed on all pages (NO in step S603), the CPU 222 advances the processing to step S601.

In step S604, the CPU 222 performs the verification printing. The CPU 222 determines an image for the verification printing based on the condition satisfied in step S601. In FIG. 7, a verification image is set for each condition. In a case where the print timing satisfies a condition No. 1 in step S601, a verification image A is set. In a case where the print timing satisfies a condition No. 2, a verification image B is set. However, there is no restriction on setting an individual verification image for each condition, and a common verification image may be used for all conditions. A content of the verification image is described below with reference to FIG. 9D. The CPU 222 may perform control to output a printed material of the verification image to a tray different from a tray for a normal printed material. Further, the CPU 222 may perform control to output the printed material of the verification image to a tray to which a defective printed material is output.

In step S605, the CPU 222 obtains the verification result of the verification image by the verification apparatus 109. The verification result basically includes information about a flag indicating a pass or a fail. The verification result is an example of the verification result.

In step S606, the CPU 222 determines whether the verification result of the verification image is an intended result. Normally, a purpose of the verification printing is to check whether the verification apparatus 109 is properly operating. Thus, an image of which the verification result is a fail is basically used as the verification image, and the intended result is that the verification result is the fail. In a case where the verification result is the fail (YES in step S606), the CPU 222 advances the processing to step S603 and continues printing. In a case where the verification result is the pass (NO in step S606), the CPU 222 advances the processing to step S607. A type of a defect may be additionally checked. For example, in a case where a verification image for a positional shift is used, it is checked whether a defect of the positional shift occurs as a detection result.

In step S607, the CPU 222 stops the printing operation of the printing apparatus 107. This is because it is highly likely that the printing apparatus 107 or the verification apparatus 109 is not normally operating and is not in a state where a print quality can be guaranteed. In this case, it is necessary to check that the setting is correct by rechecking the setting of the verification job. However, the control by the CPU 222 is not limited to the above-described control. The CPU 222 may perform control to display only the verification result on either or both of the displays of the external controller 102 and the printing apparatus 107. Further, the CPU 222 may perform control to stop the printing operation only in a case where the verification result of the verification printing is an undesired result for a predetermined number of times or more.

Figure 8:
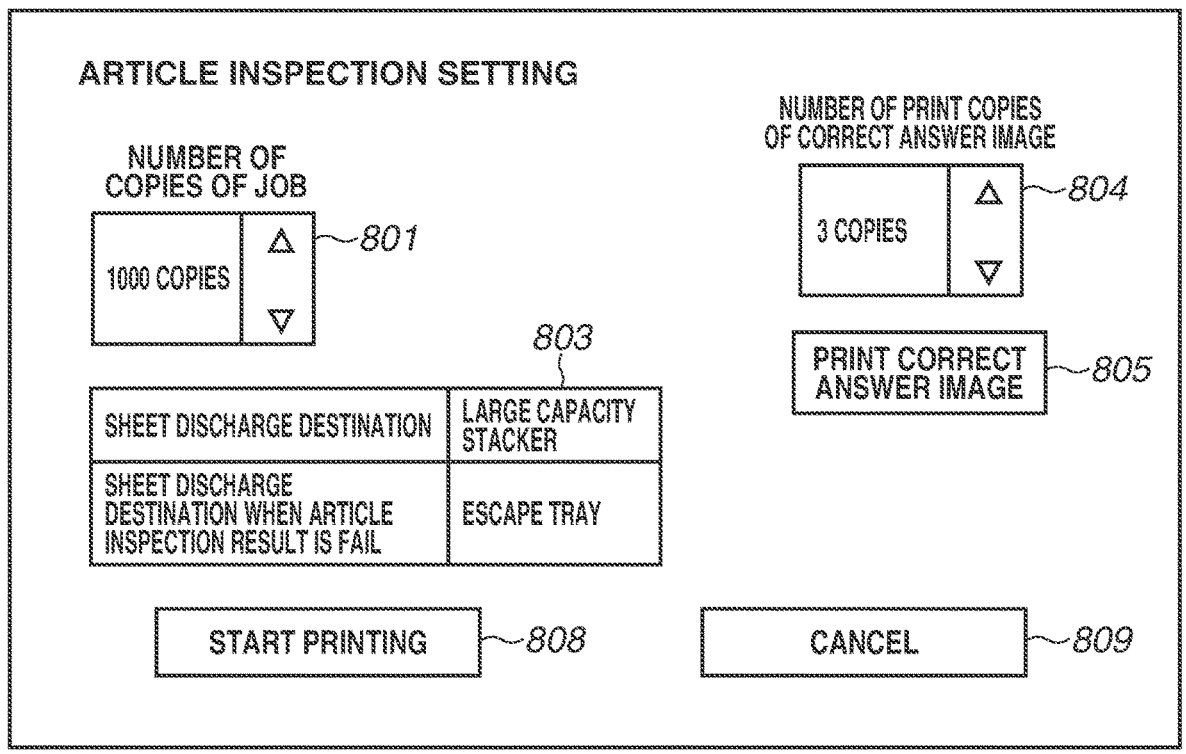
FIG. 8 illustrates an example of a setting screen of a verification job displayed on a display of an external controller.

Next, FIG. 8 illustrates an example of a setting screen of a verification job displayed on the display 212 of the external controller 102. An instruction to feed a printed sheet of the correct answer image and a printed sheet of a verification target to the verification apparatus 109 is issued from the external controller 102.

A setting portion 801 is used to set the number of copies of a job. In the example in FIG. 8, a setting is made to print 1000 copies of a job.

A setting portion 803 is used to set a sheet discharge destination of the verification job. In FIG. 8, the large capacity stacker is set as the sheet discharge destination, and the escape tray is set as the sheet discharge destination to which a sheet is discharged in a case where the image is determined as the defective image in the verification. In addition to the above-described setting, for example, the sheet discharge destination in a case where the verification result is a pass and the sheet discharge destination in a case where the verification result is a fail may be set to the same tray. In such a case, the printed sheet that failed the verification is manually extracted later based on a list of verification results, which is not illustrated. Alternatively, in a case where the printed sheets are discharged on the same tray, the passed printed sheet and the failed printed sheet may be discharged by being shifted from each other so that an extraction operation can be easily performed later.

Buttons 804 and 805 are used to issue an instruction to print N copies of the verification job. In a case where the external controller 102 is instructed to print N copies of the verification job using the buttons 804 and 805, the printing apparatus 107 and the verification apparatus 109 respectively perform print processing and reading of the correct answer image. In addition to the present exemplary embodiment, the verification apparatus 109 may be configured to automatically instruct the external controller 102 to print N copies of the verification job via the communication cable 255 and the internal LAN 105 at the same time as when a button 808 in FIG. 8 is selected.

The button 808 is used to instruct a start of printing of the verification job. If the start of printing is instructed using the button 808, the external controller 102 inputs the verification job to the printing apparatus 107 based on the settings in FIG. 8. A user instructs the verification apparatus 109 to start the verification and then instructs the external controller 102 to start printing of the verification job using the button 808. Accordingly, the external controller 102 inputs print data to the printing apparatus 107. The external controller 102 further instructs conveyance of the printed sheet to the verification apparatus 109. If the printed sheet is conveyed, the verification apparatus 109 reads an image on the printed sheet and performs verification processing thereon. In addition to the present exemplary embodiment, the external controller 102 may be configured to instruct the verification apparatus 109 to start the verification at the same time as when the button 808 is selected and the start of printing of the verification job is instructed.

A button 809 is used to cancel the setting of the verification job.

Next, FIGS. 9A to 9D illustrate examples of display of verification printing results and setting screens of the verification printing that are displayed on the display 212 of the external controller 102. FIG. 9A is the display example of a screen in a case where the verification result of the verification printing is determined as normal.

A button 901 is used to set the verification printing. However, the setting of the verification printing is not restricted to be performed from this screen and can also be performed from another screen. FIG. 9B is the display example of a screen in a case where the verification result of the verification printing is determined as abnormal. FIG. 9C is an example of a setting screen of the verification printing. The setting screen in FIG. 9C is displayed, for example, by selecting the button 901.

A button 902 is an ON/OFF button indicating whether to perform the verification printing.

A display portion 903 displays an application state of a verification condition 1.

A display portion 904 displays an application state of a verification condition 2. The number of display portions to be displayed is changed depending on the number of set verification conditions.

A button 905 is used to add the verification condition. FIG. 9D is an example of a setting screen of the verification condition. The screen of FIG. 9D is displayed in a case where the button 905 is selected.

A setting portion 906 is used to set a timing of the verification condition. As described above, the verification condition is based on the printing operation and the state of the verification result. For example, the verification condition includes the number of print copies, the number of consecutive passes in the verification, and the number of consecutive fails in the verifications, and values of the conditions can be specified.

A setting portion 907 is used to set a verification type. An item of the verification can be set to serve a purpose of the verification of a user. The example in FIG. 9D includes a position, color tone, density, streak, and blank area. However, the verification type according to the present exemplary embodiment is merely an example. A verification image is generated from the correct answer image based on contents of the present setting. For example, in a case where the position is set in the verification image setting, the verification image in which the position is shifted from the correct answer image is generated.

A button 908 is an OK button for a condition setting. If the button 908 is selected, a set condition is added to the verification condition. Accordingly, the condition is also added to the table in FIG. 7.

As described above, in the present exemplary embodiment, the verification printing can be performed at a timing of a predetermined condition during the normal printing. The verification printing enables the user to check that the printing apparatus 107 and the verification apparatus 109 operate normally, and thus quality of a printed material can be guaranteed.

In the disclosure, it is possible to increase a degree of certainty of quality assurance of a printed material.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-010113, filed Jan. 24, 2020, which is hereby incorporated by reference herein in its entirety.

What is claimed is:

1. An apparatus comprising:
   one or more controllers including one or more processors and one or more memories,
   the one or more controllers configured to:
   control printing an image on printed material,
   control reading the image printed on the printed material,
   determine the read image based on a reference image,
   perform sheet discharge control of the printed materials based on a determination result,
   wherein, in a case where printed materials with determination results indicating a normal printed material continue for a predetermined number or more, a defective image is printed, the printed defective image is read, and the read image is determined, in a case where the determination result of the defective image is determined to be normal, printing is stopped.

2. The apparatus according to claim 1, wherein, in a case where the determination result of the abnormal image is determined to be abnormal, printing is continued.

3. The apparatus according to claim 1, wherein the one or more controllers is configured to continue printing in a case where the determination result is an intended result and stop printing in a case where the determination result is not the intended result.

4. The apparatus according to claim 1, wherein the one or more controllers outputs the printed material of the image to a tray different from a tray for a normal printed material.

5. The apparatus according to claim 1, wherein the one or more controllers outputs the printed material of the image to a tray to which a defective printed material is output.

6. The apparatus according to claim 1, wherein the one or more controllers outputs the printed material of the image that is different depending on a condition.

7. A method comprising:
printing an image on printed material;
reading the image printed on the printed material;
determining the read image based on a reference image;
perform sheet discharge control of the printed materials based on a determination result,
wherein, in a case where printed materials with determination results indicating a normal printed material continue for a predetermined number or more, a defective image is printed, the printed defective image is read, and the read image is determined, in a case where the determination result of the defective image is determined to be normal, printing is stopped.

8. The method according to claim 7, wherein, in a case where the determination result of the abnormal image is determined to be abnormal, printing is continued.

9. The method according to claim 7, wherein the printing continues to print in a case where the determination result is an intended result and stops printing in a case where the determination result is not the intended result.

10. The method according to claim 7, further comprising outputting the printed material of the image to a tray different from a tray for a normal printed material.

11. The method according to claim 7, further comprising outputting the printed material of the image to a tray to which a defective printed material is output.

12. The method according to claim 7, further comprising outputting the printed material of the image that is different depending on a condition.

* * * * *